May 5, 1931.   J. B. McDEVITT   1,804,264
AUTOMOBILE VENTILATOR
Filed June 25, 1929

Inventor:
James B. McDevitt
By Stevens and Batchelor
Attys.

Patented May 5, 1931

1,804,264

UNITED STATES PATENT OFFICE

JAMES B. McDEVITT, OF CHICAGO, ILLINOIS

AUTOMOBILE VENTILATOR

Application filed June 25, 1929. Serial No. 373,604.

My invention relates to ventilators associated with the tops of enclosed automobiles for the purpose of creating a circulation or change of the atmosphere therein, and my main object is to provide a ventilator which utilizes the side and overhead currents of the external atmosphere when the vehicle is in motion to produce the circulation or change mentioned.

A further object of the invention is to so apply the novel ventilator to the automobile body that the mechanical features thereof are entirely concealed.

A still further object of the invention is to dispense with an opening on top of the automobile for the ingress of air, and so preclude the entry of rain and dust or the clogging of the opening by snow.

Another object of the invention is to build the novel ventilator in the nature of a compact and self-contained unit which is readily applicable to the tops of enclosed automobile bodies without requiring any material change in the latter.

A final but nevertheless important object of the invention is to design the novel ventilator with utmost simplicity, whereby it may be an article suitable for both expensive and inexpensive cars.

With the above objects in view and any others that may suggest themselves from the specification and claims to follow, a better understanding of the invention may be had by reference to the accompanying drawings, in which—

Figure 1:
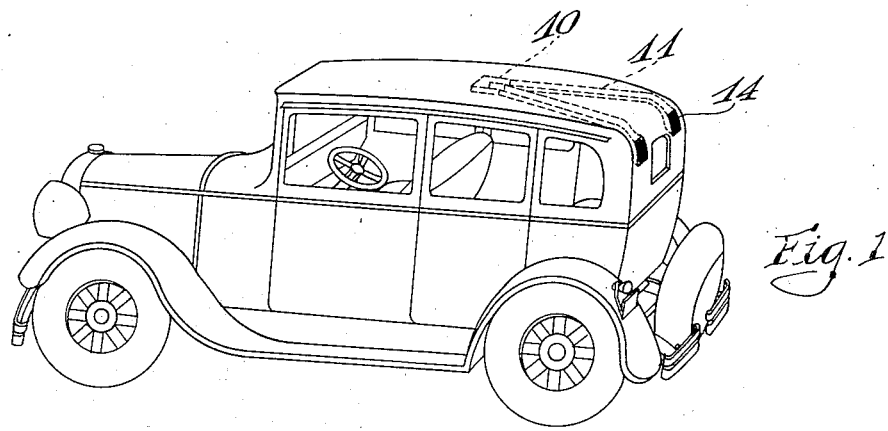
Figure 1 is a perspective view of a typical enclosed automobile, showing the manner in which the novel ventilator is installed.
Figure 2:
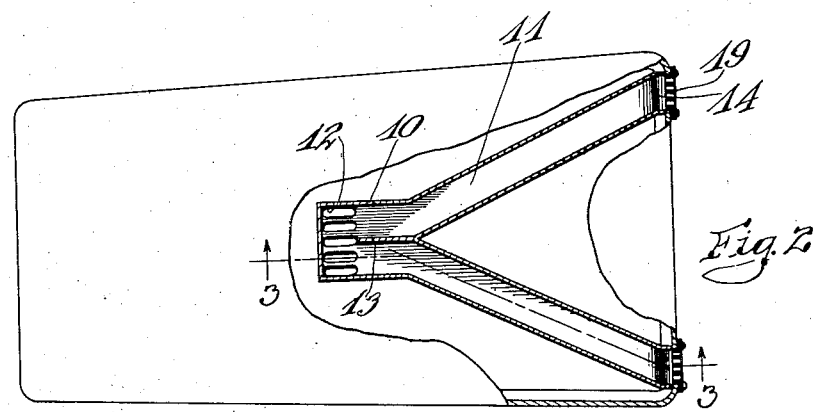
Figure 2 is a plan view of the automobile body, partly broken away, to show the novel ventilator in horizontal section.

Ventilators as a rule have been infrequently applied to automobiles, probably because of the complications involved when cars of different designs are considered. A familiar type of ventilator has been used on expensive cars, being in the nature of a small dome on top of the car and opening rearwardly. Obviously, this type of ventilator did not only detract from the appearance of the car, but also permitted the ingress of dust, rain and foreign matter and proved useless when clogged with snow. I have departed from these and other deficiencies found in ventilators of the past by providing a structure which accomplishes the above-outlined objects to their fullest extent.

In carrying out the invention I use the space between the roof and the ceiling of the automobile body to dispose the novel ventilator. The latter consists of a shallow metal box 10 positioned approximately in the center of the car and extended rearwardly with divergent conduits 11. The box 10 is closed, except for the communication with the conduits 11 and a transverse series of floor slots 12 in front. The box is, however, divided medially by a partition 13 which extends from the meeting point of the inner conduit walls to the site of the slots 12. The rear portions of the conduits 11 take a downward course as indicated at 11a and terminate with openings 14 at the back of the body and immediately beyond the top. These openings are preferably covered by grill-like plates 15 secured to the top as shown.

Figure 3:
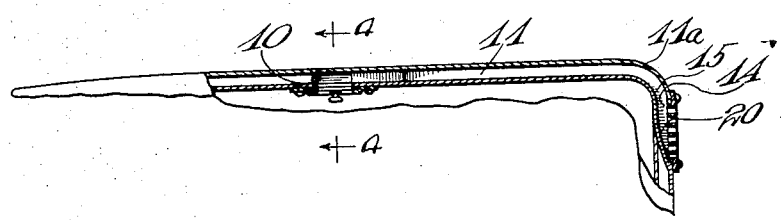
Fig. 3 is a section on the line 3—3 of Figure 2.
Figure 4:
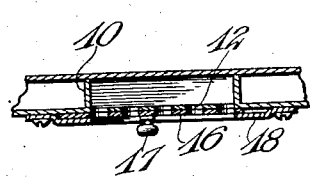
Fig. 4 is a section on the line 4—4 of Figure 3.

The slotted bottom 12 of the ventilator communicates through the ceiling of the car with the interior of the automobile body as indicated in Figures 3 and 4, and I have provided a grilled shutter 16 equipped with a handle 17 to form a register whereby the entrance to the ventilator may be varied in area, a suitable supporting frame 18 serving to form a slide bearing for the shutter 16. At the rear, a grilled plate 19 may be provided for each conduit 11, such plate serving in appearance like a register.

When the automobile is in motion, the air currents passing overhead and along the sides will serve to create a suction in the conduits 11 because of the proximity of the latter to the top and sides of the body. Thus, the still or foul air will be withdrawn from the interior of the body as the automobile is in motion. Since window or windshield cracks afford a sufficient entrance to the head wind to provide fresh air at all times, it will be seen that the air in the body will be changed continuously, yet maintain the desirable temperature because its motion may be checked by controlling the register 16. If faster ventilation is desired a window or the windshield may be opened to a limited extent. It will be seen that the novel ventilator is especially useful for winter driving, when it is difficult to maintain a circulation of air in the machine without sacrificing warmth or comfort. In my case, the circulation may be carefully controlled to provide fresh air and carry out the still or foul air at a rate consistent with the proper temperature in the car. Also, the movement and exit of moist air will prevent the deposit of frost on the windows.

Structurally, it will be found that the novel ventilator can be made of light material, such as sheet metal and in one unit for handy installation. In this respect, Figure 3 shows how the metal of the body may be struck in as indicated at 20 to form a lead into the conduits 11. Thus, should rain, dust or other foreign matter blow into the register, the slope of the lead 20 and the vibration of the car will clear the opening so as to permit the uninterrupted action in the conduits 11. The partition 13 in extending as far as the slotted formation 12 precludes the draft from one conduit into the other should suction in one conduit exceed that in the other, as from a gust of wind. The conduits are therefore designed to draw from the interior of the automobile whether the external atmospheric conditions are uniform or unbalanced.

I claim:—

1. An automobile ventilator comprising a chamber with the fore part of its floor perforated to communicate with the body interior, a partition in the chamber to the rear of its perforated portion, and conduits diverging rearwardly from the divided sections of the chamber, the outlets of the conduits being through the rear wall of the automobile body.

2. The structure of claim 1, said floor fore part having a shutter manually adjustable from within the automobile to limit the perforated area.

3. The structure of claim 1, said outlet being flush with the exterior of said wall, and a grilled facing applied to the outlet.

4. A top carried ventilator for automobile bodies comprising an inclosure disposed between the ceiling and roof of the top and providing an inlet opening communicating with the interior of the body, a pair of divergent outlet conduits communicating with said inclosure and with the external atmosphere, and a partition separating the inlets of said conduits, said partition extending short of the inclosure opening.

In testimony whereof I affix my signature.
JAMES B. McDEVITT.